United States Patent [19]

Diller

[11] 4,324,624

[45] Apr. 13, 1982

[54] METHOD FOR THE ACTIVATION OF A COMPOSITION FOR FUSED BATH ELECTROLYSIS

[76] Inventor: Isaac M. Diller, 50 Park Ave., New York, N.Y. 10016

[21] Appl. No.: 701,200

[22] Filed: Jun. 30, 1976

Related U.S. Application Data

[60] Continuation of Ser. No. 428,779, Dec. 27, 1973, abandoned, which is a division of Ser. No. 3,668, Jan. 19, 1970, Pat. No. 3,806,433, which is a continuation-in-part of Ser. No. 241,895, Dec. 3, 1962, Pat. No. 3,244,604, Ser. No. 305,768, Aug. 30, 1963, Pat. No. 3,392,092, and Ser. No. 539,906, Apr. 4, 1966, abandoned.

[51] Int. Cl.³ .................... B01J 19/12; C25C 3/06; C25C 3/16
[52] U.S. Cl. .................... 204/67; 204/64 R; 204/157.1 R; 204/157.1 H; 204/243 R; 204/DIG. 11
[58] Field of Search ........ 204/67, 64 R, 289, 157.1 H, 204/157.1 L, 157.1 R

[56] References Cited

FOREIGN PATENT DOCUMENTS 785448 10/1957 United Kingdom .................. 204/67

Primary Examiner—Howard S. Williams
Attorney, Agent, or Firm—Kenyon & Kenyon

[57] ABSTRACT

An electrolyte, containing alkali halide, is physically transformed by means of activation-triggering energy falling within a continuum of parameters defining threshold and maximum limits. The activation-triggering energy comprises various ionizing and subionizing forms. The resultant energy state exists in the frozen or molten condition and, in the latter, it is maintained for economically long periods either by a simultaneously induced chain reaction which is nearly powered by the heat of the material or by continuous exposure to radiation. Refurbishing impulses continue the effect.

31 Claims, 16 Drawing Figures

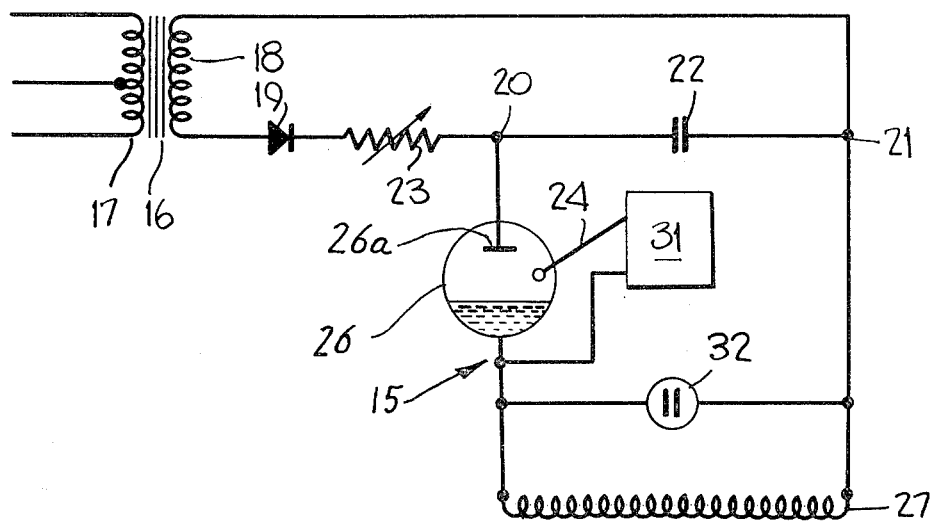
Fig.1.
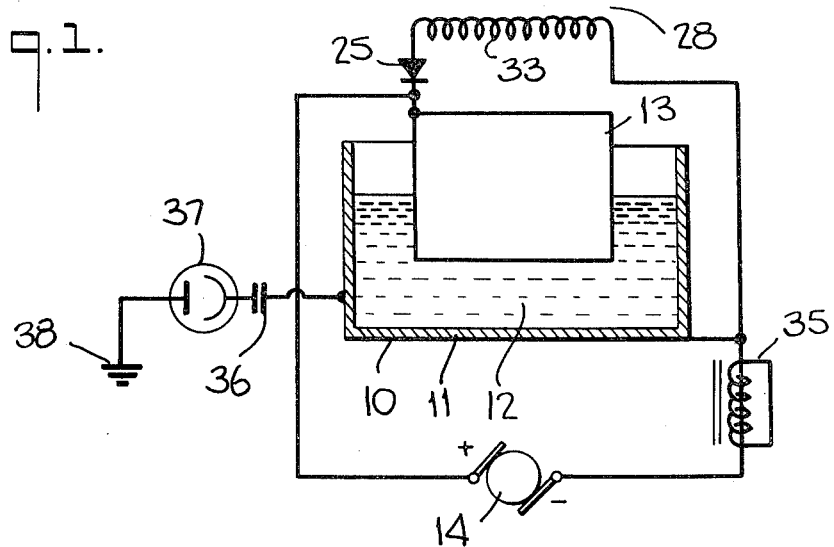
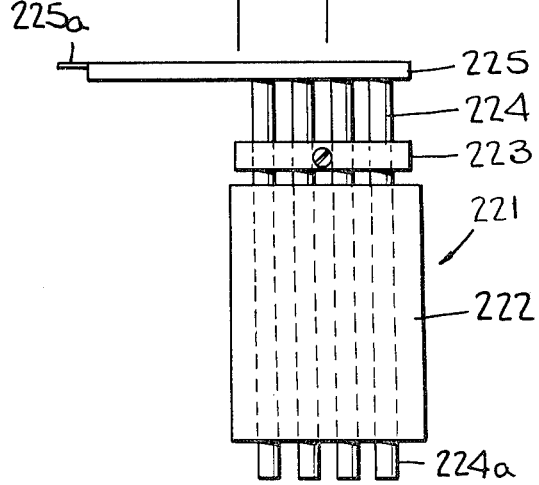
Fig.13.

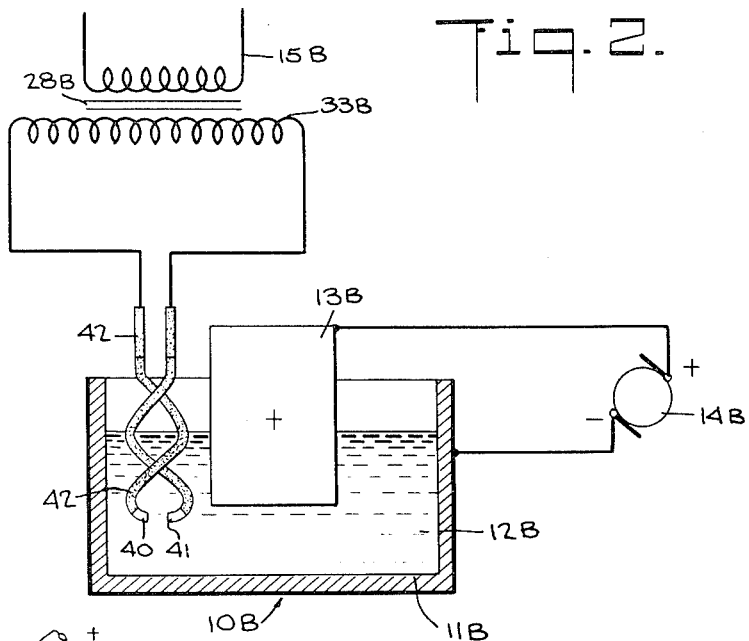
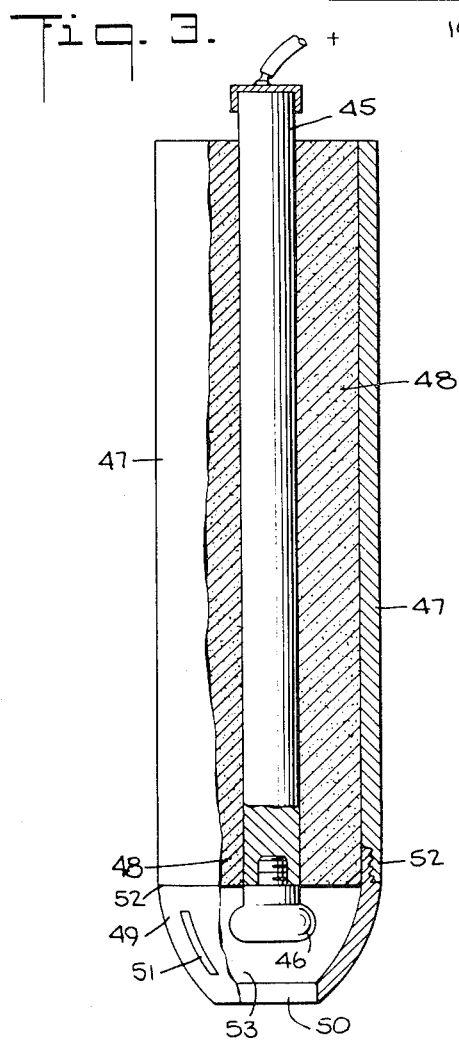
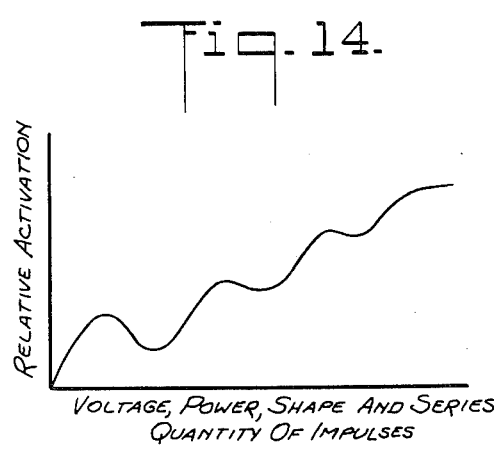

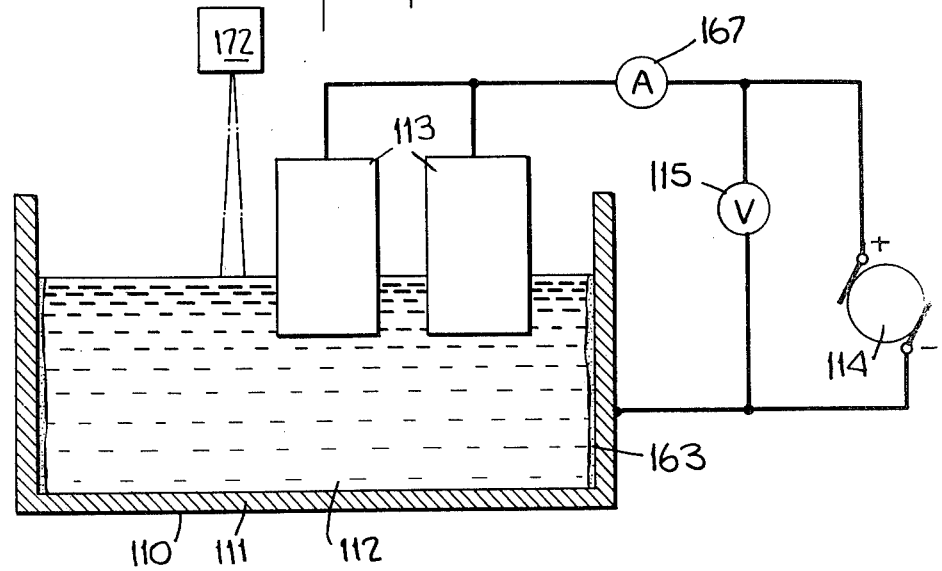
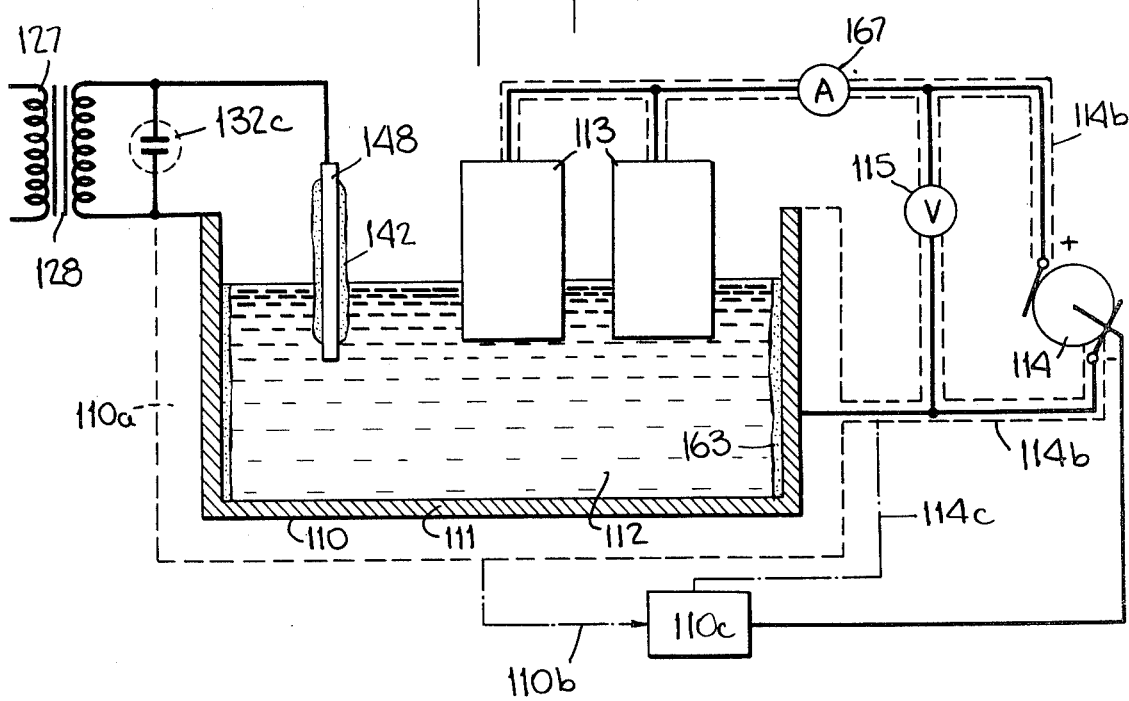

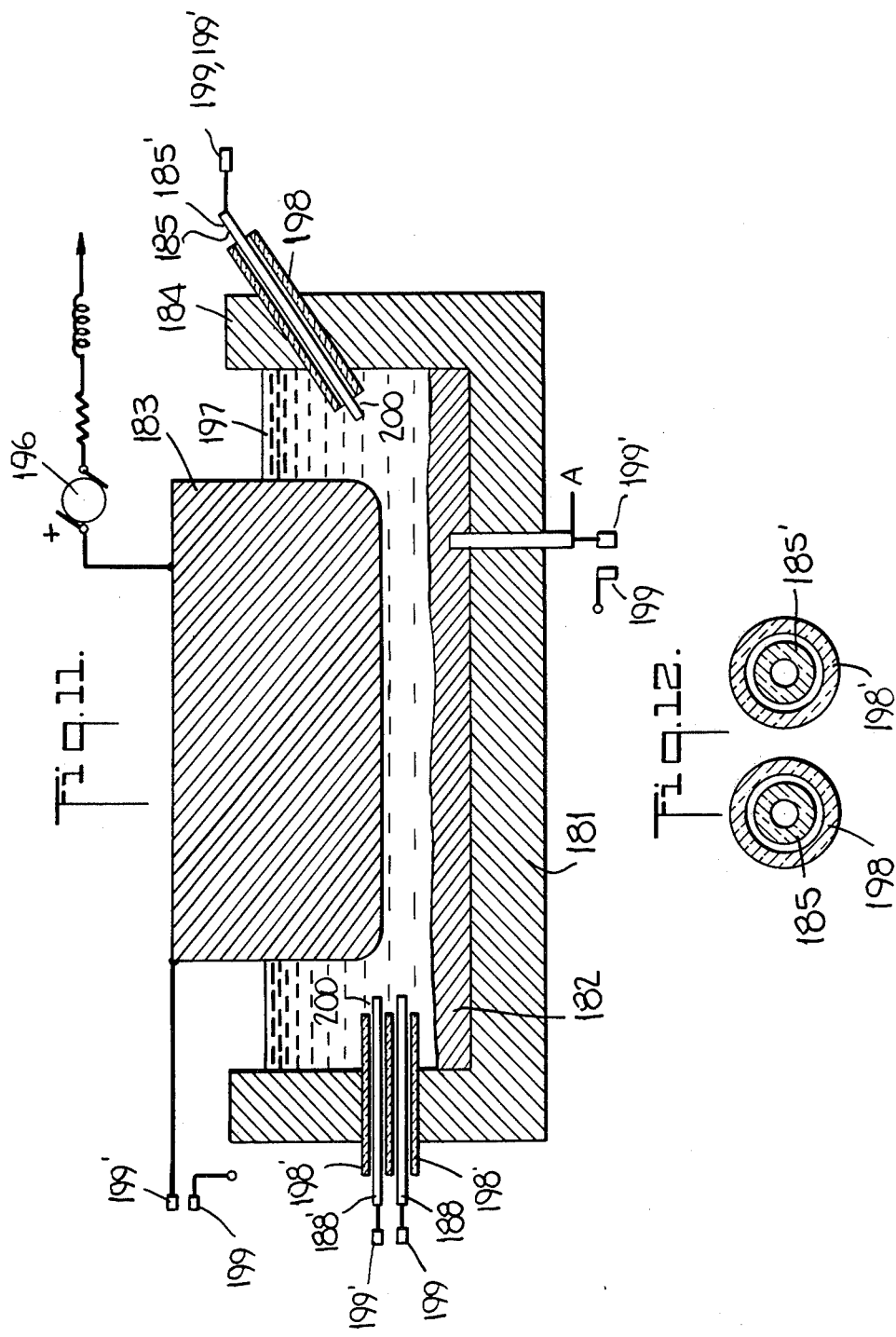

METHOD FOR THE ACTIVATION OF A COMPOSITION FOR FUSED BATH ELECTROLYSIS

CROSS-REFERENCE TO RELATED PATENT APPLICATIONS

This patent application is a continuation of application Ser. No. 428,779 filed Dec. 27, 1973, (now abandoned), which is a division of application Ser. No. 3,668, filed Jan. 19, 1970, now U.S. Pat. No. 3,806,433, issued on Apr. 23, 1974, said application Ser. No. 3,668 having been a continuation-in-part application of application Ser. No. 241,895, filed on Dec. 3, 1962, now U.S. Pat. No. 3,244,604, issued on Apr. 5, 1966; of application Ser. No. 305,768, filed on Aug. 30, 1963, now U.S. Pat. No. 3,392,092, issued on July 9, 1968; and of application Ser. No. 539,906, filed on Apr. 4, 1966, (now abandoned).

FIELD OF THE INVENTION

These patents and patent applications disclose the discovery that electrolytes such as cryolite can be activated and that such activation results in both unique increases in the rate of electrolysis for the winning of metals and marked economies in the yield of metal in relation to the externally supplied electric power. The increased rate leads to economy in labor and investment. The significance of the sharply improved electrical efficiency can be appreciated when it is understood that electrolysis for the winning of aluminum consumes a large fraction of the total world supply of electricity.

As a result of the activation, copious ions are no longer constrained by a residual lattice structure and copious ionized oxide fragments are formed. This results in collapse of ionic resistance, partial reduction and the formation of forward local voltages of the "fuel cell" type.

As pointed out in previous application Ser. No. 539,906, under proper conditions, nearly all forms of ionizing radiation, electrical discharges and vacancy-forming means such as mechanical strains can be employed to produce activation. Ample means for producing different combinations of ionizing radiation are available and their application to radiation chemistry, kinetics and chain reactions have been taking place for more than fifty years.

DESCRIPTION OF THE PRIOR ART

Because of the chronology of experimentation with respect to the present discovery that cryolite can be activated (or that any lattice can be activated) and that such activation can seriously affect the economics of the production of metal by electrolysis, and for other reasons, the modes pertaining to electrical discharge were largely set apart in U.S. Pat. No. 3,244,604. The other modes of activation and also some special modes pertaining to activation by electrical discharge are treated in the subject application. As a result there is an arsenal of modes and means and conditions which give the operator greater latitude in selecting his preferred method and means and, equally important, they give him added means to predispose, to correct, to improve results, to enjoy more latitude, to be more efficient whether in activation or in the electrolysis, and to select the type of activation, i.e. the level and ratio of one effect of activation to another.

In the previous patents and patent applications referred to above and in this patent application, the applicant has given theory from the standpoint of operation by the exemplified modes. This theory is set forth in a paper of the inventor, which was published in the periodical entitled NATURE, vol. 224, pages 877–9, Nov. 29, 1969.

SUMMARY OF THE INVENTION

Activation has been treated from the constructive position of both vibrational energy carried by phonons for releasing ions and orbital shifts for resulting in copious amounts of beneficial oxyradicals which supplement the electrical input by reacting with a carbon anode that is used for electrolysis. The reaction produces forward "fuel cell"-type voltages and it supplements the yield of metal by reacting with the carbon anode to produce partial quasi-chemical reduction.

The level of activation determines the principal results as to the quantity of added free ions and the quantity of added beneficial radicals or molecular fragments accompanied by shifts in the valence shell and other excitation which if properly "selected" render them reactive with benefits such as are herein noted.

Another overt result is in the duration of the activation. On the one hand the duration of activation can be as small as $10^{-8}$ second, thus requiring continuous application of activation energy. On the other hand the duration of activation can be for as long as 48 hours, thus requiring infrequent applications of activation energy or activation-triggering energy.

Activation level alone does not determine the ratio of one type of improvement relative to another. An operator may be more concerned in some cases with having copious ions for fast operation (collapse of concentration polarization) than having copious oxyradicals which increase the yield/KWH. The greater the success with one consequence, the greater the success with the other, as a general rule, but the ratio of advantages can be favored in either direction. In the alternative an operator using electrical discharge activation may be more concerned with duration of the activation chain than an operator using radiation from spent nuclear fuel.

Activation processes are not limited to effecting certain enhanced vibrational and orbital phenomena. They also produce competing forces which in varying degree neutralize the effects or sap the energy for triggering the activation. Attempts to make up for sapped energy by using more activating power could lead even more copiously to quenching energy. The incidental formation of free electrons could annihilate phonons while encouraging radical formation. Even in annihilation, favorable higher peaks of activating energy may result, however briefly. Spin effects are generally to be avoided for the type of activation which is desired for cryolite-type electrolytes; yet spin changes can result in excitons which fuse to initiate higher levels. While other spins such as the triplet exciton might last much longer, such other spins fission out of activating range and thus sap activation-triggering energy that might have been more favorably deployed. Some energy may be consumed to induce atomic rotation rather than vibration and translation. The internal phenomena are thus seen to be complex with infinite possibility for combinations. Hence, the need for the added modes and their combinations which are herein described.

The triggering of activation in cryolite produces a cauldron of forces, some with energies far beyond that of the triggering energy. The possible combinations of internal phenomena are infinite and continuously changing. A single formulation suitable for all compositions of electrolyte, themselves continuously varying factors, and all types of electrolytic pot is unthinkable. Therefore, the method of disclosure relied upon herein is that of reciting guidelines to each mode and a large number of modes which the operator can draw upon singly or in combination, pulsing or continuous, simultaneous combinations and sequential combinations, activation in a programmed build-up and activation by predisposition followed at convenience by additional activation procedure, and activation or predisposition by use of or addition of preactivated material, fused or frozen.

The overtly and directly observable factors are overall d.c. conductivity for a given external voltage, rate capability at a given voltage, yield for equivalent of current efficiency at a given rate, and duration of activation. The operator can now choose from a wide range of level and ratio of these consequences by selecting modes, compositions, simultaneous and sequential combinations of modes and compositions. The operator, in making his choice, must realize that the relationship of activation triggering power in any single or combined mode to any consequence is not linear.

With a sufficient power level in the activating means, as little as a fraction of a microsecond of exposure to such power, can be sufficient to trigger activation. To some extent weaker systems can be adequate by longer pulsing or by continuous application. Another way is to deliver a large quantity of the weak power per unit of time. For example, infrared is not ordinarily considered an ionizing radiation and if infrared could activate normally, then cryolite melts, which are operated, at 1,000° C. would all perforce be activated which obviously they are not; however, if the source of the infrared were very large and its radiation concentrated as by mirrors and lenses, the cryolite could be activated or at least predisposed to activation. The concentrated source would be used for microseconds. The quantity of heat would not need to be such as to overheat and destroy the material to be activated. The material could rather be cooled by the rapid increase in its entropy. The quantity of energy is a secondary factor compared with the energy level and the quantity of activation energy per unit of time. Excessive levels can be tempered by curtailing exposure and subthreshold levels of high density can be adjusted to function by increasing the exposure time.

Activation results from a combination of energy level and quantity per unit of time and the quantity must not be so small in relation to the mass to be activated as to be quenched out and irretrievably lost or so large as to cause destruction of the material or the entry of activation-destroying forces to exceed the rate of constructive formation. The power level and the duration of its application to activation are inverse functions of the delivered quantity per unit of time, and to a lesser extent, of the total quantity of activating power.

Even where electrical discharges are the source of activation energy, the threshold voltage can be diminished, at least to the extent of achieving predisposition, by deploying a large source such as a large capacitor bank. Particularly, when used in combination with other modes, when used with high efficiency electrodes which are actually another mode also, and when used in combination with additives for increasing the dielectric constant of the melt, such subthreshold discharges can be a valuable member of the activation arsenal which is herein described.

It is an object of the invention to employ ionizing radiation for activating the melt.

It is another object of the invention to recover heat energy from the melt as well as the losses of electrical transmission with respect to the melt and to employ the recovered energy for useful purposes including the production of additional electrical energy.

It is still another object of the invention to improve the seeding technique of U.S. Pat. No. 3,244,604 by preparing activated material at normal ambient temperatures by the use of radiation, mechanical disruption, and the like or by activating and quickly freezing a melt and of subsequently utilizing the activated material for seeding a melt.

It is an additional object of the invention to increase the range between threshold and maximum and to provide alternate modes and combinations of modes and compositions for greater leeway in the activation processing, determination of activation type and limiting competing forces.

It is a further object of the invention to deploy high voltage pulses which would break down the electrolyte but for the conditions provided to prevent breakdown and yet achieve activation.

It is also an object of the invention to provide conditions for deployment of subthreshold voltage pulses.

Another object of the invention is to achieve predisposition to activation.

In one embodiment of the apparatus and method of the invention, activation is achieved by comparatively high pulse repetition rates from energy sources having comparatively low storage capacitance. In addition, increased voltages for the impulses can be used which are greatly in excess of those recited in U.S. Pat. No. 3,244,604 while limiting the impulses to an extremely short duty cycle. Furthermore by switching or the like, brief portions of the cycle of an impulse can be used for activation.

In another embodiment of the invention the auxiliary electrodes for activating the melt are formed in predetermined shapes which reduce the possibility of exceeding the energy limits when activating the melt. In addition the construction of the apparatus of the invention can in certain cases be simplified by permanently installing the auxiliary firing electrodes in the cell and preferably through the cell wall.

In an additional embodiment of the apparatus and method of the invention electromagnetic radiation such as radiation at frequencies approximately within the microwave portion of the electromagnetic radiation spectrum can be used to activate the melt. In addition radiation such as visible light and high intensity light from sources such as gas discharge devices, optical masers, lasers, and the like can be employed. Radiation from neutron sources, gamma radiation and X-ray radiation are also sources of radiant energy for activating the melt.

In still another embodiment of the invention heat exchangers are employed to recover excess heat energy from high rate operation of the activated melt and the electrical transmission lines related to the cell and the heat energy is subsequently returned to the thermal energy source of the electrical generation for the cell, or otherwise usefully deployed.

In a further embodiment of the invention, material activated at ambient temperatures by mechanical disruption, radiation and the like is employed as the material to activate a melt by the introduction of the activated material therein.

In still a further embodiment of the invention the threshold is lowered without correspondingly lowering the maxima by means of additives to the electrolyte which increase its dielectric constant and by means of electrode components such as lithium which eject assisting particles.

BRIEF DESCRIPTION OF THE DRAWINGS

Other objects and features of the invention, in addition to those described above, will become apparent in the following description and claims, and in the drawings in which:

FIG. 1 is a schematic representation of apparatus for activating a melt in an electrolytic cell;

FIG. 2 is a schematic representation of apparatus including an auxiliary firing electrode for activating a melt disposed in an electrolytic cell;

FIG. 3 is a vertical elevation section view of one embodiment of an auxiliary electrode used for activating the melt of a fused salt;

FIG. 4 is a schematic representation of apparatus for activating a melt and includes apparatus for extracting heat energy from the apparatus;

FIG. 7 is a schematic representation of the apparatus for activating a melt and including a source of radiant energy;

FIG. 11 is a vertical section view of a cell showing permanently installed auxiliary firing electrodes;

FIG. 12 is a substantially vertical section view of the auxiliary firing electrodes of FIG. 11;

FIG. 13 is a side elevational view of an additional embodiment of an auxiliary firing electrode;

FIG. 14 is a graphical representation of the level of relative activation plotted against the quality of nucleating power;

DESCRIPTION OF THE PREFERRED EMBODIMENTS

DEFINITIONS

Figure 5:
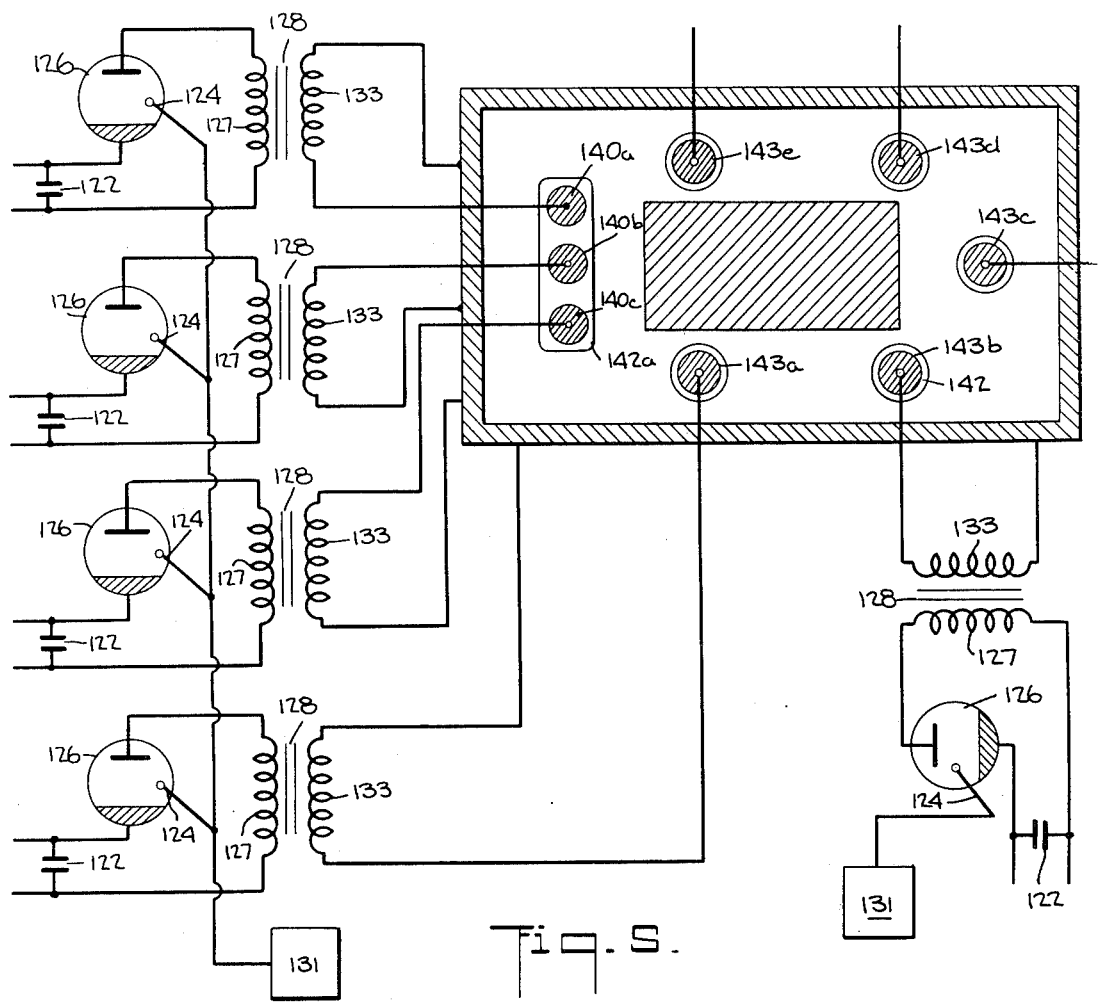
FIG. 5 is a schematic representation of apparatus of the invention including a plurality of auxiliary electrodes as well as a segmented electrode.

Cryolite
is an electrolyte which is used in the molten condition for the electrolytic reduction of oxides such as aluminum oxides. It generally contains natural or synthetic cryolite and also various fluoride salts and other halogen compounds as well as oxides.

Activation
is an excited state or a potentially excited state which is manifested in a molten electrolyte containing oxide sufficient for reduction by increased current/volt at any particular voltage, by ability to electrolyze at faster rates, and to changes in physical properties such as viscosity, impedance, broadening of X-ray diffraction spectra, etc. The activant may be frozen, i.e. below its melting point, or molten and may be used directly or as seed for activating an inactive melt or for predisposing to activation.

Ionizing Radiation
includes energetic particles and radiation such as neutrons, gamma rays, X-rays, ultraviolet rays, intense light, concentrated heat, alpha rays, beta rays and any mixtures of such particles, quasi particles and rays. The rays and particles need not necessarily be ionizing in the conventional sense. If by virtue of high density, or by combinations or otherwise, they are capable of activating or contributing to the activation of cryolite, they are ionizing radiation for the purpose of this definition.

Conductivity and d.c. conductivity
is the overall current per externally applied volt at any given d.c. voltage that is used for the electrowinning of metal. It is comprised of ionic conductivity, cell resistance, impedance factors, generation of local voltages in the cell, concentration polarization and any factors which determine the current per externally applied volt across an electrolytic cell containing a fused electrolyte for the electrowinning of metals, oxidizable anodes, and containing sufficient oxide for the reduction to proceed normally i.e. without "anode effect". It is an actual operating conductivity and not a high frequency, zero current "conductivity" between inert electrodes.

Area of pulsing electrode
or of firing electrode is the area of the smaller of any electrode pair used for conveying pulses for activation.

Pulse Duration
is the time that the pulse occupies while in the energy level that is primarily effective for producing activation. For example, if the minimum energy level calls for 2.0 electron volts (green light), the peak duration of the pulse would be that period of time during which the first peak is at 2.0 electron volts or higher.

In accordance with the teachings of U.S. Pat. No. 3,244,604, a melt can be activated by use of the apparatus shown in FIG. 1.

In FIG. 1, the electrolytic pot or cell is shown schematically and designated generally by the reference numeral 10. Such pot 10 is a conventional one having a carbon lining 11, and containing the heated bath 12 of fused cryolite-alumina maintained at a temperature of about 1000° C. by the combustion of the carbon anode and by the $I^2R$ loss generated by the passage of the electrolyzing current through the bath. Carbon electrode 13 is disposed in the bath 12. The carbonaceous lining of pot 10 serves as the second electrode 11. Both electrodes 11 and 13 are connected to a source of continuous low tension DC voltage, of about 5 volts, such as generator 14, depicted in FIG. 1.

Associated with the above pot 10 and its electrical circuitry is the pulse generating circuit 15. Step-up power transformer 16 has its primary 17 connected to a conventional AC voltage source (not shown). The secondary 18 of transformer 16 has a series-connected rectifier means 19 producing a rectified half-wave voltage across output terminals 20, 21 and is of sufficient capacitance to store the energy of one pulse. For each square centimeter of electrode, the capacitance may total from about one to eight microfarads.

The variable resistor 23 limits the rate of charge of the storage condenser 22, the latter being of the pulse or low internal inductance type.

An ignitron 26 is provided and the anode 26(a) is connected to the junction of resistor 23 and condenser 22. The cathode is optionally connected through the primary 27 of stepdown transformer 28 to the opposite side terminal 21 of condenser 22. The grid 24 of the ignitron 26 is appropriately biased by any conventional means such as the relay or firing timer 31. Neon bulb 32 is shunted across the primary 27 to indicate delivery of pulses to the primary 27 in a fashion soon to be described. The secondary 33 of step-down transformer 28 is connected to the electrodes 11 and 13 of the bath 12 as shown. Filter choke means 35 is series-connected to one side of the low tension DC circuit to protect the DC generator 14 from the high voltage pulses delivered to electrodes 11 and 13 by the relaxation oscillator circuit 15. Ordinarily, the generator and generator circuit have ample choke inductance, however.

In accordance with the teaching of co-pending application Ser. No. 241,895, a melt can be activated by use of the apparatus shown in FIG. 2.

A pulse generating circuit 15B, approximately equivalent to that described above, it also employed in this modification. Pulses of from about 1000 to 3000 volts are produced in bath 12B by adjustments in circuit 15B and step-down pulse transformer 28B. Electrodes 40, 41 are connected through transformer 28B to the oscillator circuit 15B. The electrodes are small and portable, and may be removed from bath 12B when necessary. Auxiliary electrodes may be employed in pot 10B if it is desired to enhance the Crystal Effect therein. These auxiliary electrodes are similar to electrodes 40, 41. Each auxiliary pair may have its own source of pulse energy, or an entire array of auxiliary electrodes may be serviced by a single power supply. An independent, low tension DC circuit is required to deliver the electrolyzing current to pot 10B. Generator 14B generates the required e.m.f., and is connected to anode 13B and liner 11B of pot 10B which serves as the cathode. Electrodes 40 and 41 are stranded for better surface conductivity, and they are twisted (as in FIG. 2) or coaxial (FIG. 3) for minimum reactance. The firing tips are preferably made of tungsten, nickel and nickel alloys such as nichrome and monel; they may contain a fractional percent of lithium and they may also be made from other conducting, non-melting material such as platinum, carbon, titanium boride or the like and these may contain additives such as nickel, lithium, chromium and copper. Oxidizable materials are preferred, however, particularly at the anodes. Electrodes 40, 41 are also insulated except at the discharge faces by an insulating material 42 such as boron nitride. Insulating material 42 extends above the bath 12B. This prevents shorting by hot gases above the bath.

The general operation of the apparatus described above, for obtaining either the Mobility or Crystal Effects, may be described as follows, it being understood that this invention is not to limited by the operation so described. With the primary 17 of transformer 16 connected to a 440 AC voltage supply, a very high voltage is produced in the secondary winding 18. This voltage is rectified by rectifier means 19, and is delivered in the form of half-wave pulses through variable resistor 23 to condenser 22. The resistor 23 is adjusted, for example, to charge the condenser 22 at rate sufficient to enable it to cause one flash of neon light 32 every half-second for the Mobility Effect described below, or 6 flashes in a five-second period for the Crystal Effect also described below. Firing may be set to occur at the point at which the condenser charges to its full voltage, the ignitor being prebiased accordingly; or by regulating the discharge by firing the ignitor through timer 31.

By a succession of such half-wave pulses, condenser 22 is charged to a pre-selected voltage, at which voltage the operating potential of the ignitron 26 is reached as determined by the bias voltage applied to the ignitor 24 by firing timer 31. This causes ignitron 26 to fire or conduct, thereby discharging condenser 22 through the ignitron 26 and into the series-connected primary 27 of step-down transformer 28, producing a high voltage DC pulse which is delivered to transformer secondary 33 and thence to the electrodes 11 and 13 or 40 and 41 (see FIG. 4). In a modification of this apparatus, transformer 28 may be eliminated or bypassed, and the current discharged from condenser 22 may be delivered directly to the electrodes 11 and 14 or 40 and 41. The alternate charging and discharging of condenser 22 takes place at a rate determined by the adjustment of either or both the variable resistor 23 and the timer mechanism 31. The impedance of the discharge path is such that a sharp pulse can be obtained, whereby about 90% of the power stored in the capacitors is discharged in about one microsecond (see FIG. 2). Condenser 22 is of a size such that it will provide bath 12 with the current required for a high voltage discharge through the extremely low resistance of the fused salt bath.

It is understood that inductance or magnetic storage means can be utilized in the pulse generator circuit. When the apparatus of this invention is to be used with a plurality of electrolytic pots, a direct current generator and flywheel switching apparatus (not shown) may be used to feed current directly to the switching tubes, which would be timed in synchronization with a rotary switch (not shown) connected to pots 10 as described in more detail below.

FIG. 4 shows a circuit having auxiliary anode 140 for high tension firing. The auxiliary anode is not directly connected to the low voltage supply. It is fired through the secondary of pulse transformer 128 although it may also be used with the circuitry of FIG. 7. I have found that in the employment of the apparatus of FIG. 9A, it is not necessary further to isolate the low voltage source from pulse transformer 133.

In FIG. 4, auxiliary electrode 148 is preferably shielded with insulator 142. The material of auxiliary electrode 148 can be amorphous carbon while the material of insulator 142 can be boron nitride. The material of the electrode 148 can be a metal such as tungsten, the oxide of which sublimes at the temperature of the melt, or nickel which is more efficient or any other suitable conductor preferably one that is oxidizable. Cell 110 is shown with frozen cryolite 163 which serves to insulate the side walls of the cell and this further assures maintenance of the predetermined gap between auxiliary electrode 148 and cathode 111. Shielding 142 can be found to be useful in preventing flashovers in the ionized gases immediately above the melt. In another embodiment of the invention auxiliary electrode 48 may be in the form of a transducer for imparting the requisite acoustic energy to the melt.

In FIG. 5, auxiliary electrode 140a is shown shielded and separated by insulator 142a but closely spaced to auxiliary electrodes 140b and 140c. Each of the auxiliary electrodes is connected to a storage capacitor 122 firing through ignitron 126 and all the respective ignitors 124 are fired substantially in unison by firing device 131.

FIG. 5 also shows auxiliary electrodes 143a–143e spaced around the pot for simultaneous or intermittent firing from the same or different high energy sources. These additional auxiliary electrodes can be desirable when one is concerned with the short term effects which are available at the lowest activation levels. The group 140a–140c is a system for mounting one firing electrode in several insulated sections. Thus each section requires a smaller switch and presents a higher load resistance. The switches are triggered simultaneously for such a system.

Ionizing radiation equipment which can be employed in carrying out the method of the invention is conventional and in use for radiation chemistry and other purposes. Reference sources for such systems are "Atomic Radiation and Polymers" by Charlesby, Pergamon, 1960 and "Introduction to Radiation Chemistry" by Sprinks and Wool, Wiley 1964. Machine sources include cyclotron, betatron, X-ray, linear accelerator, phasotron and synchrotron. Radioactive sources include spent fuel elements (free of neutrons), radioactive elements emitting alpha, beta and gamma rays, mixtures such as Ra+Be, Co-60, Ce-137 and reactors with chemical loops to expose cryolite to high levels within a reactor, the latter sources providing radiation of largely gamma and neutrons. These radiations might destroy phonons while producing radicals and radicals upon reaction with the anode regenerate phonons, thus allowing added possibilities for controlling the ratio of the types of improvement afforded by activation of electrolytes.

Interdependent as the different improvement and destructive forces of this activation are, different ratios can be obtained. Phonons produce vibrational and resonance effects on the residual lattice which release ions and destroy concentration polarization and electrons which can destroy these phonons are constructive to the extent they assist in formation of excited radicals that can react with the oxidizable anode and produce partial direct reduction and fuel cell type voltages which supplement the yield of metal per KWH. The phonon action results in reduction of viscosity and this can go excessively far, rendering nearly all materials too porous to contain the activated melt. Excess of any one type of activation leading to overwhelming of the effect by coincidental competing forces can be avoided in part by combining activation methods. Thus it is seen that providing for this arsenal of methods enables the operator to choose what is most economical for him and to balance the various benefits to match any set of preferred conditions.

EXAMPLE 1

This example illustrates the action of the circuit of FIG. 4. Electrode 148 was in four segments (FIG. 13) containing Ni-80% Cr-20% and Li-0.1%. The four segments were connected to a single transformer, transformer 128. Anodes 113 were separately metered by a pair of recording ammeters 167 in order to observe the activation built-up from different locations. It should be observed here that the activation was produced with 15 microfarads on the same quantity of cryolite as in Example V. However, many more impulses were fired before it could be observed that the highest or any level of activation was reacted. The auxiliary was a very small anode of 0.2 square inches, which was adjusted for a side current equivalent to about 0.3 square inches. With this size anode and a 15 microfarad storage capacitor, the firing rate was two per second. Here it should be noted that the firing rate goes down with increase of firing anode area. Eight discharges were fired before even stopping to observe the effect and, of course, there could not be much observation of the effect on the low volt anodes of eight square inches each in the four seconds. It was determined that the current in the nearer anode started to climb sooner than the current in the distant anode. This initial rise does not represent the activation level but rather the spread of nuclei of the chain reaction. The shock front did not carry very far. The chain reaction started to build up at the nearer anode but diffusion of the chain proceeded with only a small time delay. In the final plateau, there was no delay at all as between anodes. After several minutes both anodes operated at about 120 amperes per anode having increased from about 70 amperes per anode. The operating condition then rose to about 1200 amperes per anode almost simultaneously on both meters. The principle approach from 120 amperes to about 1080 amperes for each anode occurred about one minute apart, the nearer anode being first. They both reached 1200 amperes and held 1200 amperes simultaneously. The time for the total rise to this level from the initiation of pulses was nine minutes. The distant anode lagged by a few minutes at the 120 ampere level. Each of the low voltage anodes had an effective area of about eight square inches. Eight pounds of cryolite of 4% aluminum oxide were in the bath. Eight shots at the rate of two per second were made with a ⅜" gap. The reversal was 60% and the rise time was 0.4 microseconds. The pot was silicon nitride with graphite cathode end walls set into it, the end walls being insulated from the melt with cemented sheets of silicon nitride, the impulse peak reached about 100,000 amperes at 3,000 volts.

During the experiment described in Example 1, the active oxyradicals resulting from the activation processing chemically attacked the carbon electrolyzing anode upon being electrically brought into proximity with it. Consequently all the energy neccessary for reduction need not be provided by the external electrical supply. In the above example, 650 grams of aluminum were recovered in about a half hour so that in effective equivalents of current efficiency, the yield computes to about 160%. Because there was a decrease in the back e.m.f. and a formation of forward internal voltages of the fuel cell type, and for other considerations, it is believed that in an activated melt, of this example, the faradaic current efficiency accounts for only about one-fourth of the productivity while about three-fourths of the productivity is accounted for by the direct action of the active oxyradicals on the carbon of the anode. Moreover, this reaction resulted in the internal generation of at least 17 forward volts which countered back voltage and other voltage losses. Previously, the carbon was expected to combine only with such oxygen as had already been obtained by the electrolyzation. Moreover, during the experiment, higher current productivity was obtained at higher rates disproportionately.

U.S. Pat. No. 3,244,604 shows that the energy state and all its benefits, that is to say the level of activation of the melt, can be augmented by subsequent series of applications of high energy. Moreover the energy state can be maintained or reinstituted by such means. In this energy state, there are probably some orbital transfers to the valence shell. Essentially, however, there is established a phonon wave of energy vibrating acoustically in a frequency range which, as a result of calculations, believed to be in the range of about $5 \times 10^9$ cycles per second. The function of the rapid application of direct or indirect field effects at high energy levels is to induce and reinforce this vibration in an intensity such that a chain reaction is produced in which the desired phonon effects are maintained for useful long periods of time. When the phonon energy is sufficient to cause a vacancy, additional phonons are released by the exiting ion thereby continuing the chain.

This application discloses additional discoveries related to the methods and apparatus for utilizing the effects which have been produced and also to disclose indirect means for producing the requisite force fields and the consequent phonon waves necessary for activation of the melt.

As recited in U.S. Pat. No. 3,244,604, in the fused cryolite-alumina bath, there are in effect ionized constituents still unfree and locked in the crystal lattice form, and to achieve the breakdown of the lattice, with the consequent freeing of additional ions, various techniques may be employed: temperature increase, ionizing radiation, and high voltage. The industry cannot increase the temperature over a long period without excessively destroying the cryolite. If, in addition, high energy is applied according to the processes of this invention, there is further lattice breakdown with release of additional ions. The higher the temperature, the lower the voltage needed for a given degree of improvement notwithstanding that field effects are generally annealed at high temperature.

Radiations indirectly produce electric fields in the residual crystals or interact with the electric fields in the residual crystals to produce similar perturbations and phonon waves with similar consequences. These modifications of the method or process, even while deploying similar threshold and maximal requirements, have advantages either in causing further productivity, increased efficiency, an increased processing latitude, or in providing a degree of convenience with respect to the use and nonuse of directly immersed electrodes in the high energy system. In addition to radiation, U.S. Pat. No. 3,244,604 teaches the activation of a melt by seeding the melt with activated material. Some of the alternate methods of activation herein described are valuable for supplementing the activation procedure with one or more of the other variations of the original process.

The teachings of U.S. Pat. No. 3,244,604 with respect to preestablishing the optimum pattern of high energy application still prevail. Study of the phenomena of activation suggests that during the chain nucleation period, the dielectric constant of the residual crystals is not materially changed but that the dielectric constant is substantially lowered once the chain sets in. This means that projection of the electric field effects, directly or indirectly induced, is less efficient and more energy or more rapidly applied energy is required for further activation to a higher level. This requirement compresses the useful region of applied energy between threshold and maximum levels. The maximum level is not correspondingly affected by the dielectric constant. The maximum conditions are probably the consequence of the generation of free electrons and these bypass and annihilate the phonons. The objective is to obtain the point where the phonon to electron ratio is high enough to be beneficial to rate of productivity and efficiency of the electrowinning process.

The alternatives set forth in this application are that one method can be used short of the threshold for activation of the melt in order to induce predisposition whereupon another mode completes the activation without incurring excessive trapping of the activation energy. For example, the fused electrolyte can be irradiated with a continuous one megacycle wave at 0.5 MW per sq. inch and electrical discharges are then applied at lower peak voltage, fewer pulses, lower repetition rate and lower pulse duration. In another example, spent fuel elements provide a continuous activating force and, if desired, this can be supplemented by adding any of the other modes.

CLOSED CYCLE PROCESS

In this improvement on my process, the productivity of a single unit such as shown in FIGS. 1, 2 and 4 is increased in the order of approximately fifty times while electrical power consumption from an external source is reduced to a comparative vanishing point, for example, to the range of about 1 KWH per pound of aluminum.

The Hall type melt, for example, in the arrangement of FIG. 4, is activated to a high level so that, as in the above reiterated example, the current at 5.0 volts is increased by about thirty times. The heat production due to higher current losses, faster carbon reacting with oxy ions and faster carbon burning with oxygen is about 27 times as much as is normal for a pot of this size. Heat exchangers 110a are attached to the pot walls and the heat exchange fluid, such as molten sodium, is conducted by line 110b, to a turbogenerator or other converter of heat to electricity (identified as reference numeral 110c). The resultant electric power from the turbogenerator is fed back into the electrolyzing power supply 114 by conductors 114a.

As the conductors will be carrying about 3 million amperes, these can also be provided with heat exchangers 114b for cooling and this heat too can be fed by line 114c, to the closed cycle electrical production facility 110c. In view of the higher current together with the carbon coreaction within the melt the productivity is about 50 times that of a normal furnace of comparable size. The heat from several such units may be fed to a single heat to electricity converter.

In addition to extracting excess heat energy for use in the generation of the electrolyzing current, the extracting of excess heat energy can be employed as a means of controlling the temperature of the melt. As a result, where activation of the melt enables the electrolyzing current to be drastically increased, such as by a factor of two to thirty over conventional practice, the extracting of excess heat energy enables the temperature of the melt to be maintained at a proper level when otherwise the increased rate of operation could induce destructive temperatures.

Similarly, the conductors may be equipped with passages through which cooling fluid is pumped. They may be equipped with fins, heat exchangers or gas flow and thus economically deploy the higher current densities which are feasible with this invention short of changing to smaller pots.

SUPERVOLTAGE

By limiting impulse duration to 10 nanoseconds, it has been possible by means of an arrangement similar to that of FIG. 1 or FIG. 4 to activate a melt with a discharge peak of 50,000 volts. Preferably, for this usage, the limited impulse duration is achieved by reducing the storage capacitance, or by crowbarring to prevent dielectric breakdown by supervoltage.

The lack of duration is compensated by increasing the repetition rate to a comparatively high rate such as 1000 impulses per second while further compensating by reducing the area of the firing electrode (40 and 41 in FIG. 2, 148 in FIG. 4, etc.) and the size of the storage capacitor (22 in FIG. 1, 122 in FIG. 5, etc).

EXAMPLE II

Instead of activating a 100 amp. pot by means of 10 impulses spaced a half second apart from a capacitor bank of 15 uF which is charged to 6000 volts but delivers through a circuit which attenuates the voltage to 3000 volts at the discharge zone, there can be used a repetition rate of 1000 impulses per second, a capacitor of 0.15 uF, and 100 impulses in an activation series. The firing electrode area in the example is 0.05 sq. in. The duration is 10 nanoseconds at 50,000 volts.

PARTIAL SUPERIMPULSE

There is an advantageous effect on the rise time in a capacitor storage bank that is larger than necessary for a given firing electrode but such excess storage may cause an excessive charge which destroys activation. It has been discovered that the capacitor bank (such as capacitor 22 of FIG. 1, 122 of FIG. 2) can be increased by ten times while cutting the impulse very short with a crowbar action. The first quarter cycle of the impulse is limited to about one-tenth of its natural duration.

EXAMPLE III

In a pot having 20 sq. in. of electrolyzing anode area and a total surface of about 40 sq. in., a 350 uF capacitor bank was charged to 6000 volts and then fired from 5 sq. in. of carbon anode to the normal cathode. The discharge was cut off within a total of 1 microsecond, counting time from where the rise had reached 300 volts. The peak voltage was about 3,000 volts at the discharge zone, attenuated from 6000 volts by the firing circuit impedance. A single such impulse was sufficient to produce a high level activation.

SUBTHRESHOLD VOLTAGE

A subthreshold voltage can produce a low level activation suitable for predisposition provided that it is backed by a large capacitor and offset by a large impedance in the discharge circuit. For example, firing from a nickel-chromium-lithium anode with an area of 0.2 sq. in. into 10 lbs of molten cryolite, from a capacitor bank of 100 uF charged to 5,000 volts with circuit impedance such that only 600 volts maximum appears at the electrodes and obtaining a stretched out rise time of 5 $\mu$s and a first quarter cycle duration of 35 $\mu$s, resulted in a current density at the electrolyzing anode of 2.5×normal at 5.0 volts. This type of activation is mild on the pots and other equipment It is now upgraded, if desired, by adding dielectric additives and/or using any of the methods herein referenced.

CONTINUOUS WAVES-RADIO FREQUENCY & SPENT FUEL RADIATION

In U.S. Pat. No. 3,244,604 pulse reversal or direction is not material as such, although for condenser discharge, percentage reversal is an indication of the nature and amount of impedance match. With continuous radio frequency waves, it is possible to match impedance notwithstanding the reversals. These waves, for example, in the wavelength of the order of 10 cm in wavelength, can be used to perturb the residual crystal structure of the salt and the oxide components. In accordance with the method, radio frequency focused from source 170 by line 171 (FIG. 6) onto the annular area or any other such free space in pot 110. Broad tuning of the frequency to melt 112 is satisfactory. Any crust may be broken or left intact. The threshold power is of the order of 5 MW (megawatts) per sq. in. while the irradiated area is preferably at least 0.5% of the electrolyzing anode area. For a pot size corresponding to an anode area of 20,000 sq. in. the irradiation time is of the order of ten minutes with the other parameters of this example. Meters corrected in circuit with the electrolyzing current can show by their change whether nucleation is continuing. The radio power of source 170 is turned off when nucleation has shown some leveling. Should the effect then diminish, destroy activation with an overdose of radiation and begin again terminating sooner.

Spent nuclear fuel elements may be similarly deployed. Their continuous radiation may be combined with pulsed or continuous modes of continuous radio waves. Both these modes are suited to continuous activation energy without necessarily developing a chain reaction.

The radiation quantity may be pulsed into the material to be activated. For example, the total dosage is divided into a hundred aliquots with the in between offtimes longer than the ontimes, but not so long that augmentation of the nucleation does not take place. The larger the area of irradiation, the shorter the irradiation period. The augmentation time limits, during nucleation of the chain effect, discussed below are based upon the disclosure of co-pending application Ser. No. 241,895.

FIG. 14 shows the activation level in relation to the rise time as well as the power and voltage shape of the impulses and their number and spacing. When optimally carried out, the highest level is reached. This level has the greatest duration and the greatest advantage in terms of overall improvement of conductivity. It can be seen that the curve is not continually upward. Moreover, once a level is obtained and stabilized, it can be more difficult to bring it to a higher level. There is then presented an established lower resistance without the larger anode area which would allow a larger storage bank to be used with it. Moreover, the dielectric constant is lower once activation sets in and more energy is required to produce nucleation thereby compressing the range between the threshold and the maximum parameter groups.

Various devices herein described may now be used to so refine the impulse shape and power that it is possible to break out from one level into a higher one. It is far more satisfactory to predetermine the parameters and to continue the application of impulses with a satisfactory shape, etc. before any one activation level has reached a stabilization point. Depending upon the size of the pot, the entire impulse firing can be completed in a period of time such as about 15 seconds to two minutes, with the stabilized level, particularly for the better levels of activation, being reached after a longer period, such as in about 15 minutes. The very lowest level of activation will not necessarily last even 15 minutes. However the lowest level of activation alone represents a very substantial gain compared to any previously known power saving improvement for the electrolytic reduction of alumina. Of course, the higher and more durable levels of activation are preferred.

It is desirable, therefore, to predetermine by a few experiments, the pattern which will result in a higher activation level. The pattern is complete in an initial period, for example a period of about two minutes, while the activation for that predetermined level is reached after a subsequent period, for example 15 minutes later. The impulse series initiates the chain and the chain then builds itself.

LIGHT

Radiation in the frequency region of light waves is also capable of perturbing the residual crystal structure. Light vibrations of sufficient intensity produce indirect and equivalent field effects in the crystals so as to split off phonons. Due to scattering and spectral width, there are variations in light frequency. These produce a beat effect in the desired frequency range of about $5 \times 10^9$ cycles per second at which phonon travel at acoustic speeds is induced.

The light beam must have an intensity in the order of about 5 MW (magawatts) per sq. in. of irradiated surface. A hole is made in any crust formation of melt 112 (FIG. 7) at the side of radiation before such radiation can have major effectiveness. The necessary intensity may be achieved by focussing the light from an intense device 172 such as a xenon flash or from an optical maser. At least 0.01% of the surface of the melt must be thus illuminated and the pulse of light should endure in the order of 5 microseconds. The pulses are repeated frequently enough to produce augmentation of the nucleation but not so frequently as to destroy activation.

In a variation of the apparatus of FIG. 7, an intensity which is a million times as high, such as may be generated by a ruby laser (172), is radiated over an area of at least 0.001% of the pot surface and the impulse duration is limited to the order of 10 nanoseconds.

Irradiation with light produces electric fields which encourage free electrons and the critical range is therefore constricted. The indications of excessive intensity, area and duration are similar to those cited above and in the co-pending application.

Any of the techniques previously disclosed herein may be combined with one another or with the direct electrical field or the activant-seeding discovery of U.S. Pat. No. 3,244,604 to produce activation. The restrictions hitherto disclosed continue to apply, particularly in that the combined power must surpass a threshold and remain below a maximum and in that larger quantities of dissolved oxide are to be preferred and at least $2\frac{1}{2}\%$ oxide must be dissolved.

Thus an intense light beam may irradiate the fused material while electrodes supply electric fields from a capacitor storage supply and the combined impact is above the threshold and below the maximum criteria. A subthreshold light beam used in this manner can ease the problem of adequately powerful and adequately controlled impulses from another activating source, particularly when working in the more constricted range which applies when upgrading from an existing activation level such as described below from co-pending application Ser. No. 241,895.

Figure 8:
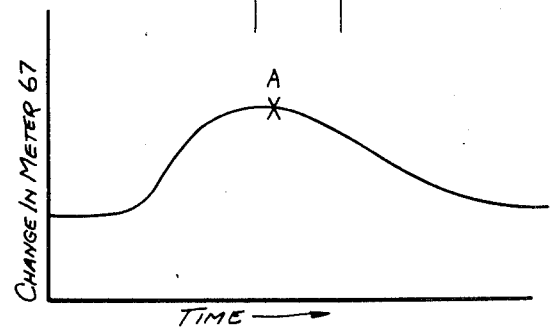
FIG. 8 is a graphical representation showing the effect of an impulse applied during activation on the conductivity of the melt during the few seconds immediately following the application of the impulse and further showing the optimum point for the firing of a subsequent impulse.

Having shown successful impulse shapes, there is now shown with FIG. 8, a way to determine the successful point at which to refire the impulse before obtaining the stabilized level from which it is difficult to rise. Assuming that the low voltage is constant, the current in the low voltage anode will rise for a few seconds and possibly begin to fall as shown. If the current does not rise, the impulse has been totally ineffective and must be reshaped. The fall as shown in FIG. 8 will take place even though the impulse is to be eventually successful and even though a series of like impulses will in the succeeding 15 minutes produce a good level of activation. Point A shown in FIG. 8 is the idea time to fire the next impulse. Additional impulses may be fired before Point A is reached. In that case, they will be less efficient. Unless the additional impulse is fired at some point of the rise, its chance of being effective is reduced and each impulse may be thus individually extinguished without producing any permanent effect or without producing an effect which is greater than would be enjoyed as a result of a single such impulse. If the impulses are fired too soon upon each other, the concentration gradient may be destroyed, and the series of impulses will be worth even less than a single one of them. The consequence would be similar to that of an extremely long pulse. It is therefore, advisable to fire succeeding impulses somewhere in the rise, preferably just before the descent at point A. When experiments are made with a small firing anode, i.e. about 0.15 square inches, and correspondingly small capacitor 122, point A is reached in about one-fifth of a second. With a firing anode area of ten square inches, it has been found that point A is reached in about 15 seconds or more. In any event, it would be satisfactory to fire again within 15 seconds. With these guides, it will be possible to place any plant into operation with this invention within a reasonable period of time. The observation of FIG. 8 results from the passing of the vicinity of the initial gradient by the observing anode. It travels with an acoustical order of speed. One thus observes the action which will initiate the build up of the chain. The actual build up of the activation level may not be observed for some seconds to minutes.

The curve of FIG. 8 is reversed about the abscissa under certain combinations of geometry and parameters. The same considerations apply to the inverted curve, but an upward curve is preferred. For an inverted curve a high amplitude would still be preferred to a lower amplitude. The acoustical conditions can be changed by changing geometry or the combination of capacitance and voltage of the impulse source so that a rarefaction condition, and hence an inversion of the curve of FIG. 8, does not take place.

There is an apparent saturation point reached by the top level of activation beyond which further impulses anticipating or following the establishment of the level of activation produce no further activation. However, while no additional Crystal Effect is produced, a Mobility Effect can still be imposed.

While the change from one established level to a higher level can be difficult, there is no difficulty in restoring a level which has begun to anneal. Fewer impulses, or impulses of lower energy level, generally suffice for this purpose. If, for any reason the electrolytic cell is shut down and restarted, it would be necessary to establish the effect ab initio although a partial amount of benefit may remain.

In evaluating the indications explained in FIG. 8 it can occur that this immediate current charge is negative rather than positive. While experiments do not explain this phenomenon, they do show that activation proceeds from such impulses also. The same consideration applies to firing from point A on the corresponding current lowering curve. Such current lowering is never lasting. No matter what the anode size, it terminates in about one second. The activation may proceed upward from there. The activation may be very gradual for the first few minutes and then rise rapidly for the next 15 minutes. It has been observed that the activation can rise very rapidly, beginning in about three minutes and then reach very nearly its final value in about five minutes. While the experiments do not explain such an operation, it is believed that it is of an acoustical nature rather than of an electrical nature in that the bodies which serve to reinforce the gradient travel through the melt in clusters which are at sonic speeds. As in acoustics, the wave is sometimes reinforced and sometimes upset.

It is possible for a reflected wave to produce a rarefaction which temporarily pulls the ions out of the anodic field. That would depend on the strength of the incident shock front and the geometry of and within the pot. This may be generally remedied by decreasing the size of the storage capacitor and increasing its voltage. Also an excessively long wave or excessive intensity may cause the reflected wave to meet head on and result in sputtering, even though the dielectric breakdown timevoltage limit has not been exceeded.

In all the modes which have been taught herein and in U.S. Pat. No. 3,244,604 for activating a metal, there is a period of nucleation followed by a period during which the activation develops. The ultimate level of activation is independent of the area over which the processing is conducted. The larger the area which is attacked by the direct or indirect applications of high energy electric fields, whether such area be a single region or a combination of regions, the shorter the period of time between nucleation and activation. In a high level activation, the chain duration is generally very much larger than the period between nucleation and attainment of the full or nearly full or adequate activation, so that such period may be ignored in the choice of nucleation area for such high level activation. This observation applies also where a combination of methods of producing the perturbing fields is deployed. In any event, in any one area, the energy parameters mustlie within the critical or "resonant" zone. This requirement also sets a lower limit on the area to be nucleated.

LOWERING THE THRESHOLD

As activation sets in, the gap between the threshold and the maximum activation is narrowed. This is due to a drop in the dielectric constant of the electrolyte. In any event, it is desirable to enlarge the gap and enable greater tolerance of error in the working range. A lower dielectric constant requires more impulse energy without a corresponding increase in the maximum allowable impulse energy.

U.S. Pat. No. 3,244,604 describes the activation levels and the matter of upgrading an established activation level. The following improvement can be used either with pulsing to upgrade the activation level or for the initial pulsing. In accordance with the improvement, material having a high dielectric constant which is capable of dissolving in the melt and which will not cause the precipitation of impurities in undesirable amounts in the metal to be won is added to the melt. Such materials to be added include materials from the group comprising barium titanate, titanium oxide and barium oxide. The generally acceptable quantity of material to be added is that which equals about 2% of the weight of the melt. The use of a lithium containing electrode surface will also lower threshold.

ELECTRODE SHAPE AND POSITION

Less activation energy and hence less vulnerability to exceeding the energy limits is required when electrodes for direct application of the electric field are shaped and placed so as to send, unobstructedly, a well distributed concentration gradient, i.e., a nucleated charge out into the melt.

EXAMPLE IV

Figure 9:
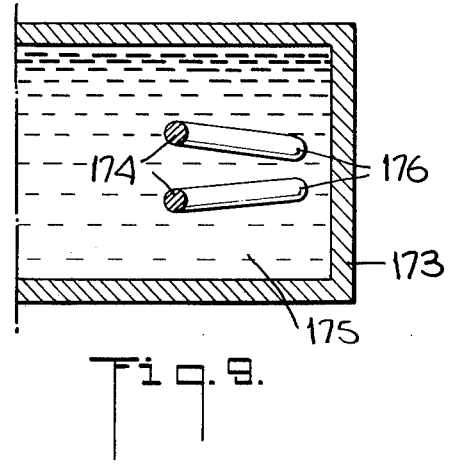
FIG. 9 is a fragmentary horizontal section showing a pair of firing electrodes each of which is in a substantially right angle form and are directed toward one another.
Figure 10:
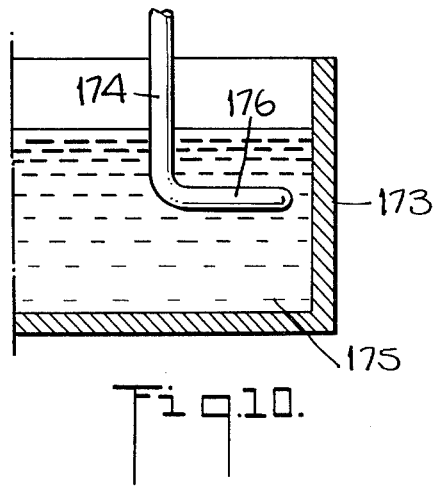
FIG. 10 is a fragmentary vertical section view of an electrolytic cell showing the firing electrodes of FIG. 9 with respect to the melt and the cell.

As shown in FIGS. 9 and 10 at one end of a rectangular pot 173 of 40 sq. in of surface, I have two vertical insulated leads 174 going into the melt 175 and there is one inch of distance between them. Each lead has a leg 176 bent at right angle one inch long and uninsulated. Legs 176 are turned, so that toward the wall of the pot 173, the distance between the ends of the legs is ½". In this manner, the impedance of the loop a,b,c,d, circumscribed by the legs, relates to the impedance offered by the melt so that the discharge between legs 176 is more nearly uniform throughout their length. Such uniformity obviates excessive energy at some points which adds to the destructive factor without reaching the threshold of constructive factor at other points. Moreover, the discharge zone opens out into the melt without being obstructed by the legs.

PERMANENTLY EMPLACED ELECTRODES

In direct application of the electric field, I have shown single electrodes and pairs and multiple electrodes inserted into the melt from above. There are advantages to having a permanently emplaced pair of electrodes for delivering the activating energy such as shown in FIG. 11 herein which substantially corresponds to the structure of U.S. Pat. No. 3,392,092. Insulating or poorly conducting tubes are inserted through the wall of the pot at a level above the highest level reached by the metal pool and below the lowest level of the crust. The electrodes may be of a material such as titanium boride which resists the action of both cryolite and molten aluminum.

The electrodes may be horizontal but it is preferred to insert the tubes through the wall so that they slope downward into the pot. This eliminates the need for liquid resistant packing. Moreover, such electrodes may be easily removed while the passage way remains permanently emplaced. Thus nickel or other desirable materials may be used at the discharge faces.

IMPURITIES

It is desirable to run the pot normally for a time before attempting to activate as there are impurities of the electron releasing type which can seriously interfere with the phonon formation leading to the activated condition. Such an impurity is vanadium. It is soon purged from the melt under electrolysis. It is preferred that the refractory hard metal or other firing electrodes contain no more than about ten parts per million of vanadium.

AUXILIARY ELECTRODE CONDITIONING

The surface of the firing electrode (such as 40, 41 in FIG. 2, 46 in FIG. 3, 148 in FIG. 6) plays an important part. I prefer to switch a low DC voltage through these firing electrodes for a few minutes prior to activation in order to clean and condition the surfaces. In order to narrow the time gap between the surface conditioning and the impulse arrival, the low voltage can be left on during the moderate high energy firing.

In inserting the firing electrodes or firing electrode pairs through the wall of the pot, tubes of poorly conducting material are cemented into the wall and the firing conductors are passed through the tubes. The impulse source is connected to the conducting electrodes either as required or the connections are fixed and the conductors are inserted. If the tubes are emplaced horizontally, it is necessary to use a packing. It is preferable to insert the tubes at an angle as shown in FIG. 1 in order to obviate the difficult application of packing in the hot, corrosive melt.

The advantage of using auxiliary firing electrodes in this manner is that it is not necessary to chop a hole into the crust for the insertion, inspection or refurbishing of the firing surfaces. Another advantage is that the level above the molten surfaces of deposited metal is more easily controlled. It should be understood that the metal and crust surface heights are not static.

With this improvement, it is more convenient to install the auxiliary firing electrodes so that they are out of the way, so that they are emplaced for long periods, and so that they are easily engaged by corresponding terminals of a stationary or mobile surge generator. For this purpose, it is preferred to use conductors which are capable of long periods of contact with the corrosive cryolite-alumina-aluminum containing bath. The capability of refractory hard metals, particularly titanium diboride and zirconium diboride, to withstand such contact is known. As low voltage electrolyzing anodes, electrodes of such material would be too costly and current efficiency would suffer; however they have been successfully as auxiliary high tension anodes for the activation process. The anodic wear is very small, being the equivalent of but a few seconds of use as low voltage anodes and, when the process is more effectively applied, the reuse of the high tension is not required more often than hours to days apart.

FIG. 11 shows a pot 181 containing a metal pad 182, a bath 197 and a low voltage electrolyzing anode 183. The metal pad 182 and the anode 183 are connected to the negative and positive terminals respectively of a low voltage source of direct current 196. Inserted and cemented or gasketed into the pot wall 184 are one or more slanting tubes of low conductivity 198 or similar horizontal tubes 198' and these are made of a resistant ceramic such as cemented silicon carbide or boron nitride. Into these tubes are placed auxiliary electrodes 185 and 188 respectively. The protruding portions 200 extending into the bath 197 are the firing surfaces and they are positioned with respect to gap length to the mating firing surface. In addition portions 200 are positioned to permit the maximum available clearance with respect to the wall 184 and the regular anode 183. When one of the regular electrodes 181, 183 is used as a firing electrode, electrode 185 or 188 alone is positioned, firstly as to gap and secondly as to minimal obstruction to flow of the excitation gradient. The auxiliary firing electrodes 185, 188 and their mating electrodes 185', 188' or 181 or 183 are preferable provided with connection couplings 199, 199' for connecting the surge generator.

FIG. 12 shows the lateral to vertical disposition of a pair of auxiliary firing electrodes such as 185 and 185' disposed in electrically insulating tubes 188 and 188'. Tubes 188 and 188' may be of cemented silicon carbide compositions even though they are slightly conducting.

When it is desired to use a single auxiliary electrode and one of the regular electrodes 182 or 183 to complete a pair, electrode 185 can be pushed downward and inward to provide the desired gap with pad 182 or electrode 183. The level of auxiliary electrode 188 is fixed but it can be pushed inward to gap with electrode 183 as mating member of a pair. The use of a large surface such as the mating surface of electrode 183 or of electrode 182 provides a combination of dense impulse energy at one part of a pair and dispersed impulse energy at the other part of a pair. The use of a pair such as electrode 185 and 185' provides a greater concentration of the energy at both mating surfaces. Either arrangement has been found to give satisfactory results. As stated in U.S. Pat. No. 3,244,604, it is possible to use the regular electrode pair without any auxiliary.

COLD ACTIVATION AND COLD ACTIVANT

Cryolite-alumina can be activated in the cold both by radiation and by mechanical activity such as grinding. No threshold or maximum is involved here. Cold activant can also be prepared by rapid chilling of a melt particularly between the transformation points or between the melting point and about 600° C. This part of the chill should be completed in the order of less than about 5 minutes. It is preferred that the chill from the melting point to room temperature be accomplished within that time. This may be done by pouring or by working with thin layers. It is better yet to do this with a melt that is in activation. In any event, mechanical strains on crystals also correspond to electric fields, whether the strains be induced mechanically, thermally or electrically or by seeding with activant or by any combination of such means.

Cold activant derived from chilling an activated melt has actually been used as an activation seed with the resultant quadrupling of current at the same electrolyzing voltage. The seed addition to the melt was about 5% of the entire content of the pot. In the original hot, i.e. molten activated condition, the electrolyte carried a current which was thirty times normal for the electrolyzing voltage of 4.9 volts measured between a tap in the anode and the cathode terminal.

Figure 16:
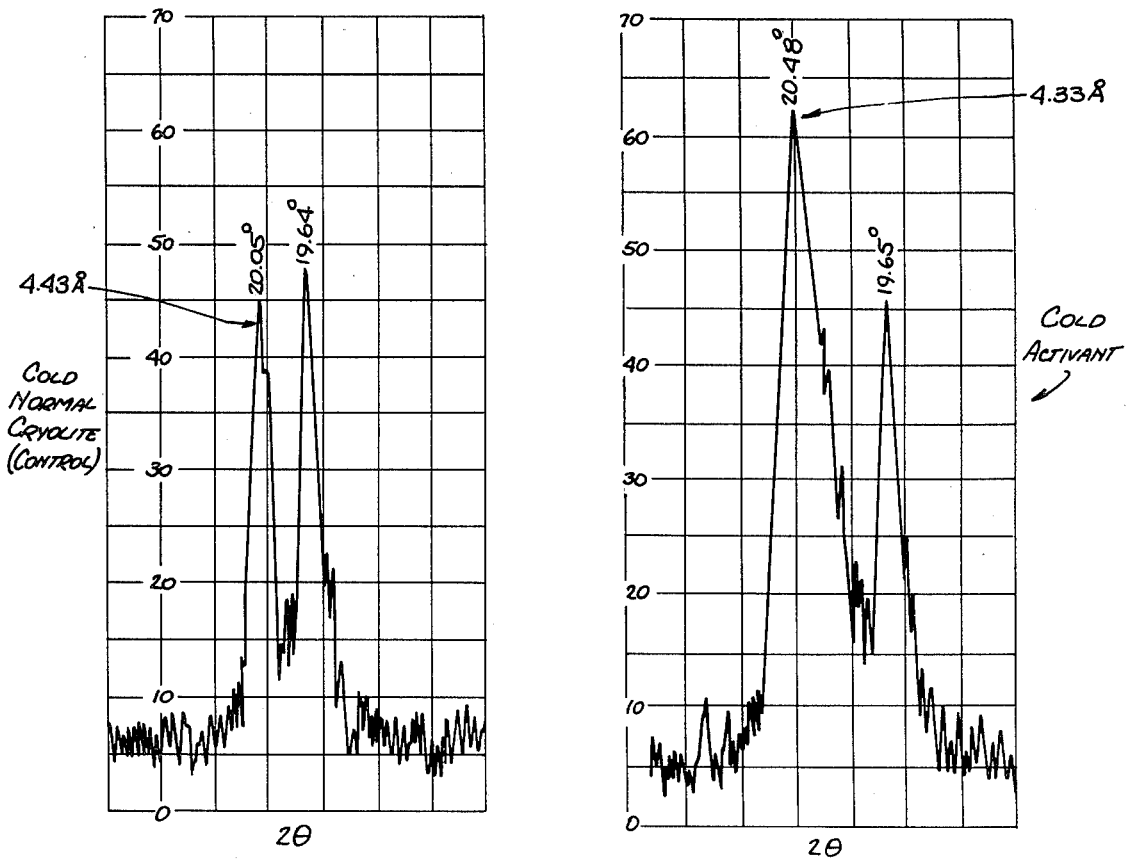
FIG. 16 shows X-ray diffraction spectra at about the 4.43 A peaks for (a) frozen, aged, previously molten and electrolyzed activated cryolite quickly chilled to the solid condition and (b) previously electrolyzed cryolite chopped from a frozen commercial pot of ordinary cryolite.

In this example, cooling was accomplished by increasing the entropy, thereby uniformly and more quickly chilling the melt. The melt was cooled to near freezing and a large capacitor charge was then fired into it. The freezing was observed by a sharp drop in conductance. Despite a long period of storage at ambient temperature, this material was effective when quickly brought to heat in a melt to be activated by such seeding. This material was submitted to X-ray diffraction spectra examination in view of results which had been obtained by taking such spectra on halide salts while in the molten condition. Despite the cold and aged condition of the activated sample, it showed similar and even more pronounced changes in the height and width of the peaks and it showed a slight shift of center in a significant peak in a manner similar to the findings for molten halide salts. FIG. 16 shows the 4.33 Å peak for cold activant alongside the corresponding peak for cold normal cryolite.

It can be observed that the peak shifted 0.1 Å. The height for the activated eryolite is 1.4X as high as the control and the width is 3.0X as wide as the control.

The cold activant should be handled in a manner to prevent excessive annealing while being heated. When using the cold activant material as seed-activant, excessive annealing can be avoided by tossing it rapidly into a pot which is hot enough and has enough heat content so that the activant is brought up to the molten condition very rapidly. It is permissible, moreover, to preheat the cold activant to nearly its first transformation point or about 600° C. for cryolite-alumina. The cold activated material need not only be used as activation-seed but can also serve as the melt itself. It must be heated so rapidly that it does not anneal entirely before the melting is accomplished.

One of the unique features of my invention is that it is possible to augment the activation effect either during the nucleation period, i.e. by the timely repulsing already disclosed herein and in U.S. Pat. No. 3,244,604, or in terms of the subsequent upgrading of the activation level as described in U.S. Pat. No. 3,244,604. Any of the indirect or direct methods of applying an activating electric field disclosed herein or in U.S. Pat. No. 3,244,604 or in any combination of such methods may be used to augment the activation level resulting from the method deploying hot or cold activant. Moreover, the activation can be maintained or reinstituted by any of these methods or combination of these methods provided only that the threshold parameters are observed and that the maxima are not exceeded.

Apart from the recognition and circumventing of annealing of the activant, it is in any event necessary to supply the activating field effects with rapid rise time.

NEUTRON RADIATION

Activated electrolyte material can be prepared by irradiating the molten surface of the electrolyte by covering at least 0.1% of its surface, with about $3 \times 10^{16}$ n/sq. in. This method is particularly applicable to the preparation of cold activated electrolyte containing more than 3% of dissolved alumina by cycling the cold material through a machine producer of neutrons.

GAMMA RADIATION

Activated material can also be prepared by using a cobalt source to irradiate the material at about $3 \times 10^9$ R. This method is preferably employed for activating cold activant as stated under "Neutron Radiation". X-rays may also be so used in the preparation of activated material whether the material is hot or cold.

What is claimed:

1. The process of activating a melt containing alumina and halide salts comprising the steps of subjecting the melt to ionizing radiation with an energy level, a quantity of energy per unit of time, and a quantity of energy per unit area at the melt and covering sufficient area of the melt at least sufficient to produce activation therein and insufficient to prevent or effectively destroy activation, the activation of the melt being manifested by a substantial increase in the ratio of current per volt applied to the melt for a given rate of electrolysis for the production of metal, the activation of the melt either enabling a voltage in the range from about 1.9 volts to about 4 volts when applied across electrodes connected to the activated melt to maintain a current therein that ordinarily would be maintained prior to the activating of the melt by a voltage of approximately 5.0 volts when applied across the electrodes or enabling an increase in the current therein that ordinarily would be maintained at any given voltage prior to the activating of the melt.

2. The process in accordance with claim 1 in which the step of subjecting the melt to ionizing radiation comprises supplying the ionizing activation energy in at least one impulse of such energy.

3. The process in accordance with claim 1 in which the step of subjecting the melt to ionizing radiation comprises subjecting the melt to radiation having a frequency in the range of radio frequencies.

4. The process in accordance with claim 1 in which the step of subjecting the melt to ionizing radiation comprises subjecting the melt to radiation emitted from nuclear fuel elements.

5. The process in accordance with claim 1 in which the step of subjecting the melt to ionizing radiation comprises subjecting the melt to sequential application of different types of ionizing radiation.

6. The process in accordance with claim 1 in which the step of subjecting the melt to ionizing radiation comprises subjecting the melt simultaneously to different types of ionizing radiation.

7. A process in accordance with claim 1 and further comprising the step of subjecting the melt to ionizing radiation to establish a low level of activation in order to condition the melt for the subsequent establishing therein of a higher level of activation.

8. The process in accordance with claim 1 in which the ionizing radiation being applied is in the portion of the electro-magnetic spectrum corresponding substantially to that of light.

9. The process in accordance with claim 8 in which the intensity of the light ionizing radiation is in the order of about 5 megawatts per sq. in. of irradiated surface.

10. The process in accordance with claim 8 in which the light ionizing radiation is that produced by a gas-discharge lamp.

11. The process in accordance with claim 1 and further comprising the step of providing an opening in the crust formation overlying the melt disposed in the electrolytic cell and directing the ionizing radiation into the opening in order to apply the ionizing radiation to the surface of the melt.

12. The process in accordance with claim 1 in which the ionizing radiation is that produced by an optical maser.

13. A process in accordance with claim 1 in which the ionizing radiation is that produced by a laser device.

14. A process in accordance with claim 1 in which the ionizing radiation is that produced by a source of neutrons.

15. A process in accordance with claim 1 in which the ionizing radiation is that produced by gamma radiation.

16. A process in accordance with claim 1 in which the ionizing radiation is that produced by X-ray radiation.

17. The product comprising activated cryolite mixture resulting from the subjecting of cryolite mixture to ionizing radiation in accordance with the process of claim 2.

18. The product in accordance with claim 17 in which the cryolite mixture is subjected to the ionizing radiation of a super voltage discharge.

19. The process in accordance with claim 1 in which the step of subjecting the melt to ionizing radiation is sustained to the point that the activation is extinguished and further comprising repeating of the step of subjecting the melt to ionizing radiation.

20. The process of activating a fused salt in order to increase the yield of metal per kilowatt-hour for a given rate of production of an electrolytic cell for the electro-winning of aluminum when the activated fused salt is electrolyzed as a melt in the cell comprising the step of subjecting the residual crystal structure of the fused salt to strain energy of an energy level, a quantity of energy per unit of time and a quantity of energy per unit of area of the fused salt sufficient to cause strains in the crystal structure which are above a threshold strain level above which the fused salt becomes activated and insufficient to prevent or effectively destroy activation.

21. A process in accordance with claim 20 in which the step of subjecting the fused salt to strain energy of an energy level, a quantity of energy per unit of time, and a quantity of energy per unit of area of the fused salt sufficient to cause a strain above a threshold strain level comprises the subjecting of the fused salt to a level of radiant energy which is sufficient to induce strains in the fused salt which transpose the fused salt beyond the threshold strain level above which the fused salt becomes activated and insufficient to prevent or effectively destroy activation.

22. A process in accordance with claim 20 in which the step of subjecting the fused salt to strain energy of an energy level, a quantity of energy per unit of time, and a quantity of energy per unit of area of the fused salt sufficient to cause a strain above a threshold level comprises the subjecting of the fused salt to mechanical strains sufficient to transpose the fused salt beyond the threshold strain level above which the fused salt becomes activated and insufficient to prevent or effectively destroy activation.

23. The process in accordance with claim 20 in which the step of subjecting the residual crystal struction of the fused salt to strain energy is sustained to the point that activation is extinguished and further comprising the step of repeating the step of subjecting the residual crystal structure to strain energy.

24. A process of activating a fused electrolyte comprising applying a high energy impulse by means of a firing electrode structure to a fused electrolyte in order to activate the electrolyte and thereby increase the yield of metal per kilowatt-hour for a given rate of production of an electrolytic cell for the electro-winning of aluminum when the activated electrolyte is electrolyzed in the cell, the firing electrode including a pair of electrode members adapted to be inserted into the melt, each of the members having an insulated lead portion adapted to extend into the melt and a leg portion extending at an angle from the lead portion and adapted to extend toward a vertical wall of the cell, said leg portion of each of said electrode members converging toward one another with the minimum gap between the electrodes being adjacent the free ends thereof, whereby the discharge of the impulse occurs between said leg portions.

25. A process for activating a melt containing alumina and halide salts comprising applying a high energy impulse to the melt by means of an electrode having a surface of nickel material containing metals in which is included a small percentage of lithium.

26. The process for producing and maintaining the activation of cryolite comprising the step of adding a quantity of preactivated frozen cryolite to the cryolite, the quantity being sufficient to cause the cryolite to become activated.

27. The process of activating a fused salt melt by combining an electrical discharge with the injection of particles of nickel and lithium comprising the inclusion of such particles in at least one electrode that is used for effectuating the discharge whereby the melt is activated, the activation being manifested by at least one of a substantial and prolonged increase in melt conductivity, a transformation discernible by x-ray spectra, and a change to extremely low viscosity in the melt, the activation of the melt enabling a voltage in the range from about 1.9 volts to about 4 volts when applied across electrodes connected to the activated melt to maintain current therein that ordinarily would be maintained by a voltage of approximately 5.0 volts when applied across the electrodes.

28. The process of activating a fused salt in order to increase the yield of metal per kilowatt-hour for a given rate of production of an electrolytic cell for the electro-winning of metal when the activated fused salt is electrolyzed as a melt in the cell comprising the step of subjecting fused salt to at least one of the group consisting of:
  (a) ionizing radiation with an energy level, a quantity of energy per unit of time, and a quantity of energy per unit area at the melt and covering sufficient area of the melt at least sufficient to produce activation therein and insufficient to prevent or effectively destroy activation; and
  (b) strain energy sufficient to cause strains in the crystal structure which are above a threshold level above which fused salt becomes activated and insufficient to prevent or effectively destroy activation, the activation of the melt being manifested by a substantial increase in the current per volt applied to the melt for a given rate of electrolysis for the production of metal, the activation of the melt either enabling a voltage in the range from 1.9 volts to about 4 volts when applied across the electrodes connected to the activated melt to maintain current therein that ordinarily would be maintained by a voltage of approximately 5.0 volts when applied across the electrodes or enabling an increase in the current therein that ordinarily would be maintained at a given voltage prior to the activating of the melt.

29. The process in accordance with claim 28 in which the step of subjecting the melt to one of ionizing radiation and strain energy is sustained until the activation of the melt is substantially extinguished and followed by the step of subjecting the melt to one of the group of ionizing radiation and strain energy to produce activation.

30. The process in accordance with claim 28 in which the fused salt is subjected to energy with predetermined exposure time, intensity and pulse rate and further comprising the step of maintaining the exposure time, intensity and pulse rate below a level at which whereby the competing forces substantially extinguish the activation.

31. The process of activating material for a melt containing alumina and halide salts when the material for the melt is in a frozen condition comprising the steps of subjecting the material for the melt to ionizing radiation while the material is in a cold condition with an energy level, a quantity of energy per unit time, and a quantity of energy per unit area at the material for the melt and covering sufficient area of the material for the melt at least sufficient to produce activation therein and insufficient to prevent or effectively destroy activation, the activation of the material for the melt being manifested by a substantial increase in the current density per volt externally applied to the melt for a given rate of electrolysis for the production of metal when the material is in a melt, the activation of the material when in a melt either enabling a voltage in the range from about 1.9 volts to about 4 volts when applied across electrodes connected to a melt containing the activated material to maintain a current therein that ordinarily would be maintained prior to the activating of the melt by a voltage of approximately 5.0 volts when applied cross the electrodes or enabling an increase in the current density therein that ordinarily would be maintained at a given voltage prior to the activating of the material of the melt.

* * * * *

UNITED STATES PATENT AND TRADEMARK OFFICE
CERTIFICATE OF CORRECTION

PATENT NO. : 4,324,624
DATED : April 13, 1982
INVENTOR(S) : Isaac M. Diller

It is certified that error appears in the above-identified patent and that said Letters Patent are hereby corrected as shown below:

Column 7, line 39, delete "it" and insert --is--

Column 8, line 6, after "to" insert --be--

Column 8, line 54, delete "140" and insert --148--

Column 9, line 8, delete "48" and insert --148--

Column 10, line 57, delete "neccessary" and insert --necessary--

Column 17, line 59, delete "mustlie" and insert --must lie--

Figure 6:
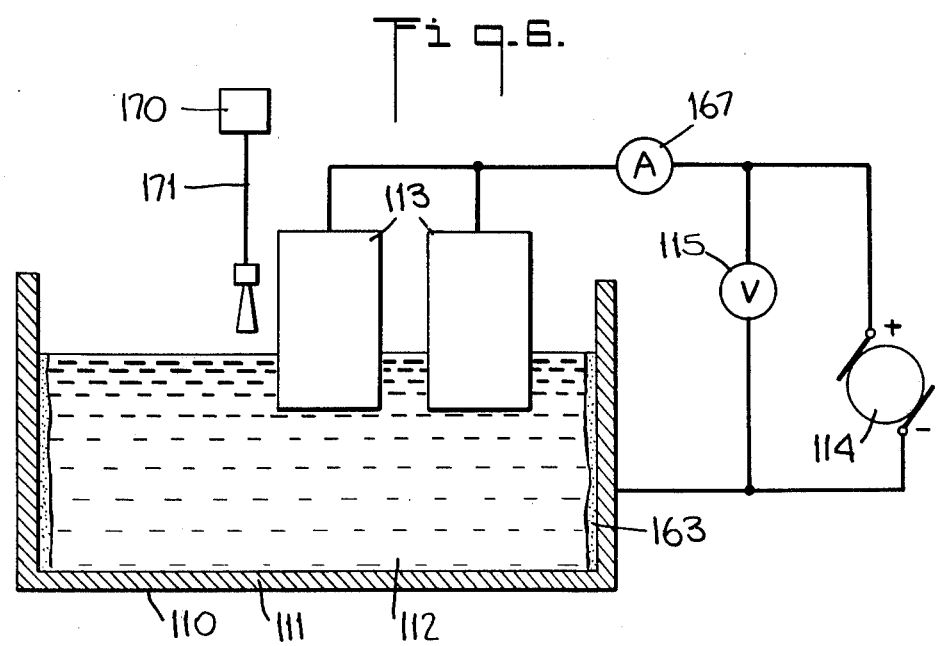
FIG. 6 is a schematic representation of the apparatus for activating a melt and including a source of radio frequency energy for use in activation.
Figure 15:
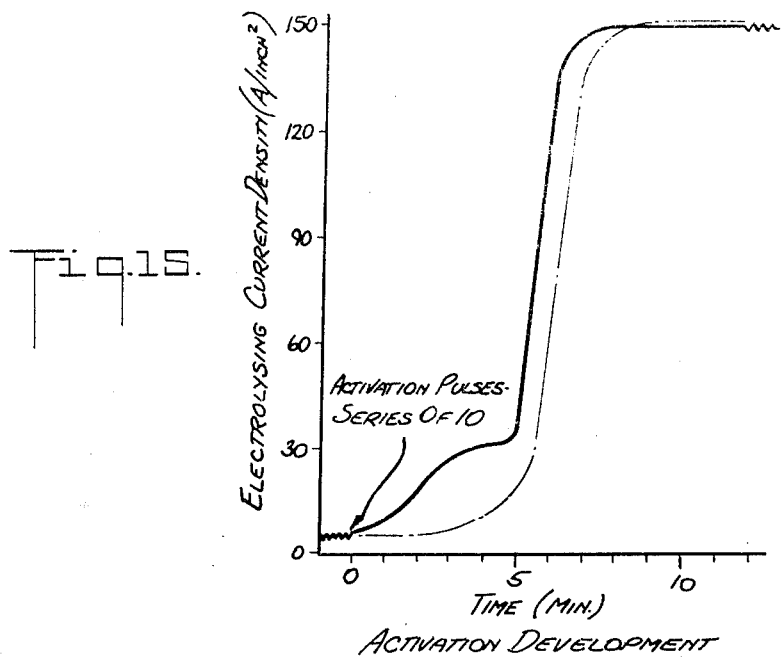
FIG. 15 shows the rise in current density on each of two electrolyzing anodes after triggering a high level activation.

Column 19, line 15, delete "FIG. 6" and insert --FIG. 4--

Column 19, line 53, after "been" insert --used--

Column 20, line 17, delete "tubes 188 and 188'" and insert --tubes 198 and 198'--

Column 20, line 18, delete "Tubes 188 and 188'" and insert --Tubes 198 and 198'--

UNITED STATES PATENT AND TRADEMARK OFFICE
CERTIFICATE OF CORRECTION

PATENT NO. : 4,324,624
DATED : April 13, 1982
INVENTOR(S) : Isaac M. Diller

It is certified that error appears in the above-identified patent and that said Letters Patent are hereby corrected as shown below:

Column 21, line 15, delete "eryolite" and insert --cryolite--

Column 24, line 6, after "containing" delete --alumina and---

Column 25 (claim 30), line 5, delete "whereby"

*Signed and Sealed this*

*Thirty-first* Day of *August 1982*

[SEAL]

*Attest:*

*Attesting Officer*

GERALD J. MOSSINGHOFF

*Commissioner of Patents and Trademarks*